June 30, 1931.  G. G. BATES  1,811,991
FRUIT SORTER AND CLEANER
Filed Jan. 11, 1928
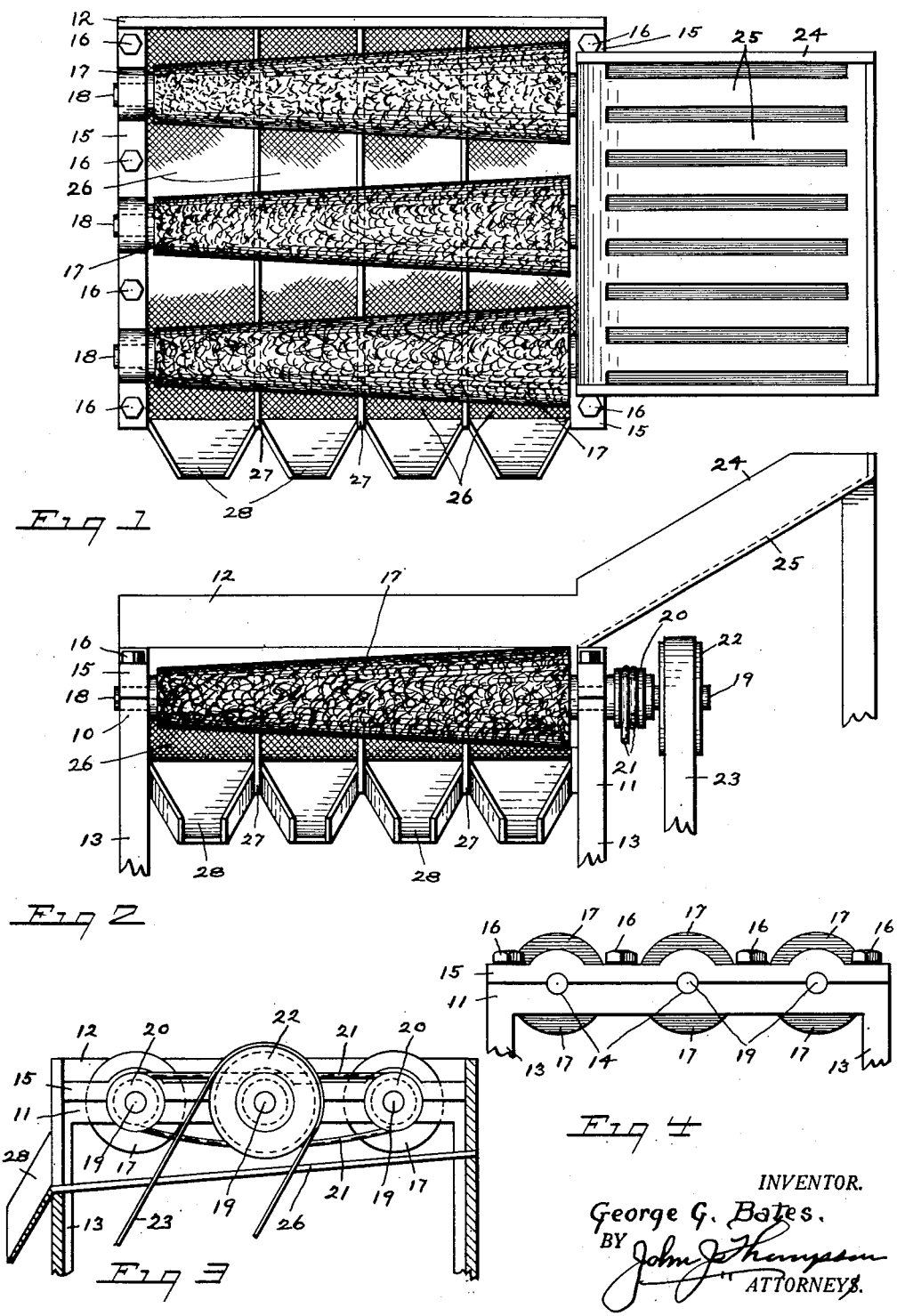
INVENTOR.
George G. Bates.
BY
ATTORNEYS.

Patented June 30, 1931

1,811,991

UNITED STATES PATENT OFFICE

GEORGE G. BATES, OF KINGSTON, NEW YORK

FRUIT SORTER AND CLEANER

Application filed January 11, 1928. Serial No. 245,927.

This invention relates to a machine for sorting, grading and cleaning or polishing fruit, such as apples, oranges, etc, and it is intended to be operated either by hand or power, being quick in its action and capable of handling the fruit in an automatic manner.

While there are machines for sorting and grading fruit, they are of such a construction that the fruit is liable to become bruised during its travel through the machine, thus becoming damaged and unfit for use, and furthermore it is not believed that there is any machine which combines grading and cleaning or polishing of the fruit during its travel through the machine.

The object of the present invention is to provide a combination machine, which will first remove all dirt, leaves and very small fruit, then clean and polish the fruit, and then grade the same as to size, and deliver to the containers.

Another object being to provide a machine in which the parts may be removed for cleaning or renewal without having to disassemble the machine.

And a final object being to so construct the machine that the fruit will be cushioned at all times to prevent damage of the same.

With these and other objects in view, my invention consists in certain construction and combination of parts as will hereinafter be fully described and claimed, and illustrated in the accompanying drawings which form a part hereof and in which like figures of reference refer to corresponding parts in all of the views, but it is to be understood that slight changes may be made without departing from the spirit of the invention.

In the drawings:—
Figure 1 is a top plan view of a machine embodying my invention.

Figure 2 is a side elevation of the same, with part of the supporting frame removed.

Figure 3 shows an end view of the machine, with the feed hopper removed, to show the driving mechanism.

Figure 4 shows a partial end view to illustrate the method of mounting the taper rolls.

Referring to the drawings:—
The machine comprises a supporting frame composed of the ends 10 and 11, which are spaced apart and secured together by the side 12, and provided with the legs or other supports 13.

The ends 10 and 11 are formed with the bearings 14 and provided with the removable caps 15 attached thereto by the cap screws or bolts 16; and within said bearings 14 are rotatably mounted the taper rolls 17 by the shafts or trunnions 18 and 19; the trunnions 19 being extended and having secured thereon the flanged wheels 20, for the accommodation of the round endless drive belt 21, which is given one complete wrap or turn around each wheel of pulley 20, so that the three rolls will be rotated in the same direction, so that the fruit will be prevented from becoming crushed between the rolls, and also tending to rotate the fruit to bring all of its surface in contact with the rolls: the rolls being covered with felt, carpet or other suitable material to form a cleaning and polishing material, to brush and clean the fruit as the same travels down the incline of the surface of the rolls; the rolls 17 being rotated through the pulleys 20 and belt 21, by a pulley 22 secured on the end of one of the trunnions 19 and driven by a belt 23 from some suitable source of power.

In place of the pulleys 20 and belt 21 there may be employed sprockets and a chain, or other suitable drive means.

Adjacent to the end 11, is mounted a feed hopper or receiving table 24 upon which the fruit is placed; this hopper being placed on an incline and having a bottom formed of spaced slats 25, so that all dirt, leaves and small fruit will at once drop through and become separated from the fruit to be graded and cleaned.

As the fruit travels down this inclined hopper or feed table 24, it comes into contact with the rotating felt covered rolls 17, which in turn rotate it, cleaning and polishing its surface, and the smaller fruit will pass between the rolls and drop onto a transverse inclined table 26 of canvas or other suitable material to prevent damage to the fruit; these tables 26 being separated by the partitions 27 and each being provided with a combined chute and sorting table 28, leading to the container, such as a barrel (not shown); and affording the operator a chance to remove any damaged fruit before it enters the container.

In this manner the fruit will be graded as the small size will pass between the rolls into the first table and so on according to size, and by the novel action of the rolls and their covering a friction will be exerted on the fruit which will turn the fruit on the rolls to act on all of its surface before it has traveled far enough to pass between them, thus cleaning and polishing the same.

If during the process of cleaning and grading, the fruit tends to pile up between the rolls, or more pressure is required for proper polishing, there may be employed a cover, composed of a suitable material such as a blanket, carpet, etc., which may be plain or quilted, and laid over the fruit and the rolls, or attached to each side of the frame to partly contact with the fruit.

Having thus described my invention, what I claim as new and desire to secure by Letters Patent, is:

A combined fruit sorter, grader and cleaner, comprising in combination with an inclined feed hopper, of a pair of end frames formed with alined bearings in the upper part thereof, shafts rotatably mounted therein, grooved pulleys secured on said shafts, a belt mounted on said pulleys including one complete wrap around the central pulley, and means for applying rotary movement to the central shaft, tapered rolls secured on said shafts, and adapted to rotate in the same direction, a cleaning material carried by said rolls, a series of combined receiving and delivery troughs mounted below said rolls at right angles thereto and in an inclined position, fabric forming the bottom thereof and adapted to receive the fruit as it passes between said rolls.

In testimony whereof I affix my signature.

GEORGE G. BATES.